Nov. 8, 1966 A. F. WORMSER 3,283,572
SPACE VEHICLE NAVIGATION SYSTEM
Filed Dec. 31, 1962 3 Sheets-Sheet 1
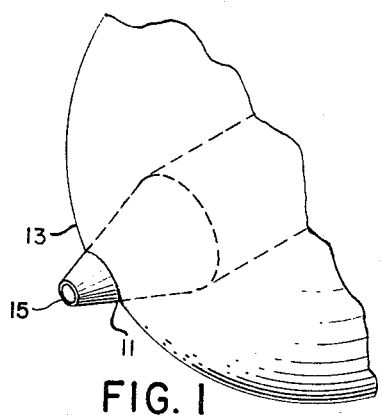
FIG. 1
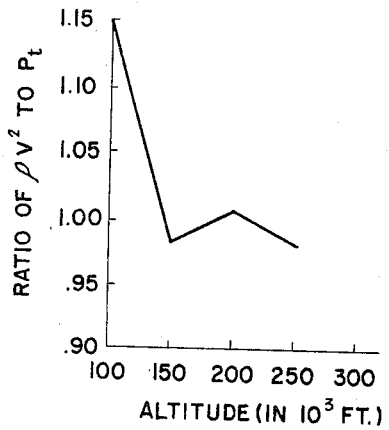
FIG. 6
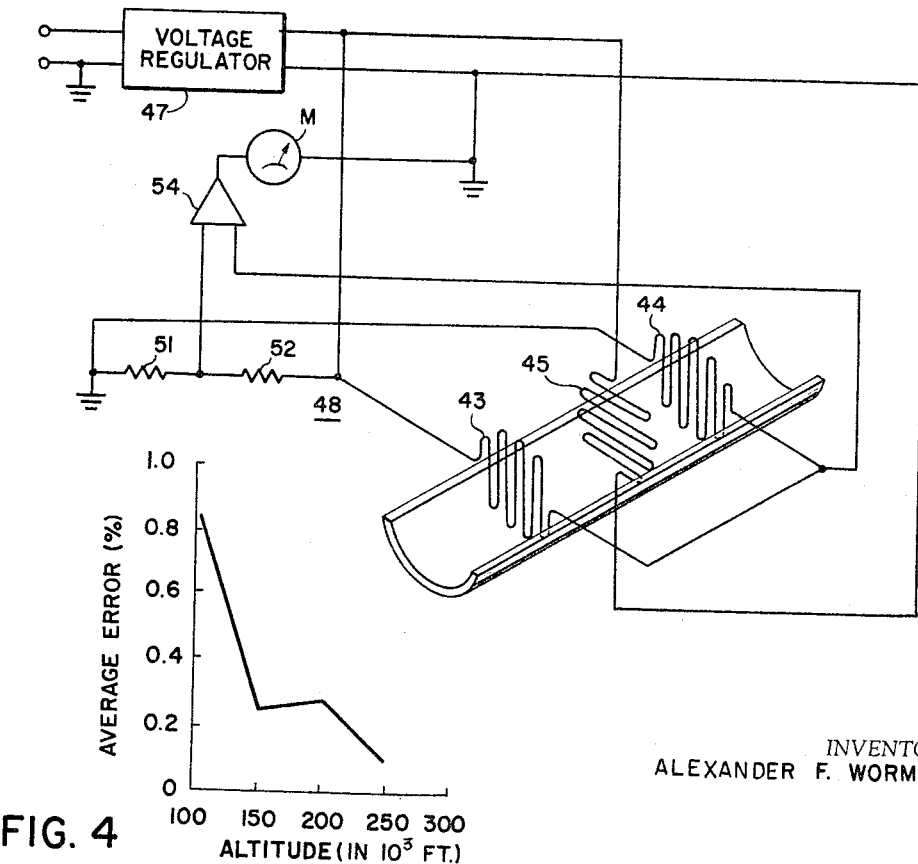
FIG. 3
FIG. 4
INVENTOR.
ALEXANDER F. WORMSER

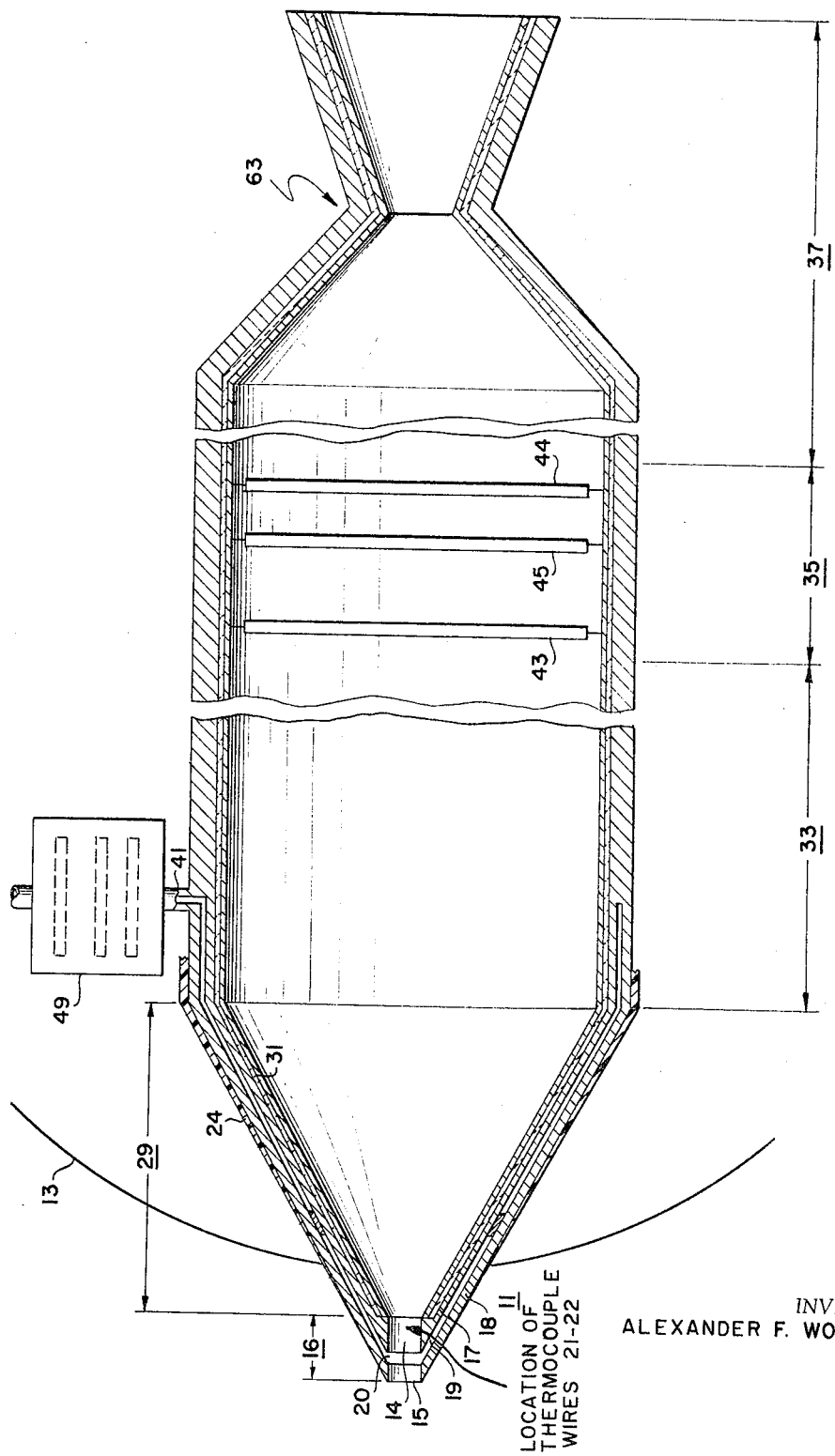

Nov. 8, 1966  A. F. WORMSER  3,283,572

SPACE VEHICLE NAVIGATION SYSTEM

Filed Dec. 31, 1962  3 Sheets-Sheet 3

FIG. 5

51: TEMPERATURE TO ENTHALPY CONVERSIONS BY STORED TABLES.
52: $C_{p_c} = f(t_{cu})$
   $C_{p_a} = f(t_f)$
53: $m_c = P_c/C_{p_c} \cdot (t_{cd} - t_{cu})$
54: $P_{mc} = m_c \cdot C_{p_c} \cdot (t_{cd} - t_{cu})$
55: $P_{ma} = P_m - P_{mc}$
56: $m_a = P_{ma}/C_{p_a} (t_{md} - t_{mu})$
57: $\Delta q = m_c \left[ f(t_{cl}) - f(t_{cd}) \right]$
58: $\left[ f(t_f) + 2JV^2 \right] = \dfrac{\Delta q}{m_a} + f(t_a)$
59: $2JV^2 = \left[ 2JV^2 + f(t_f) \right] - f(t_f)$
60: $V = \sqrt{\dfrac{2J}{2J}} (V^2)^{1/2}$
61: $\rho = \dfrac{V \cdot m_a}{A_0 \cos\alpha \cos\beta}$
62: ALTITUDE $= f(\rho)$

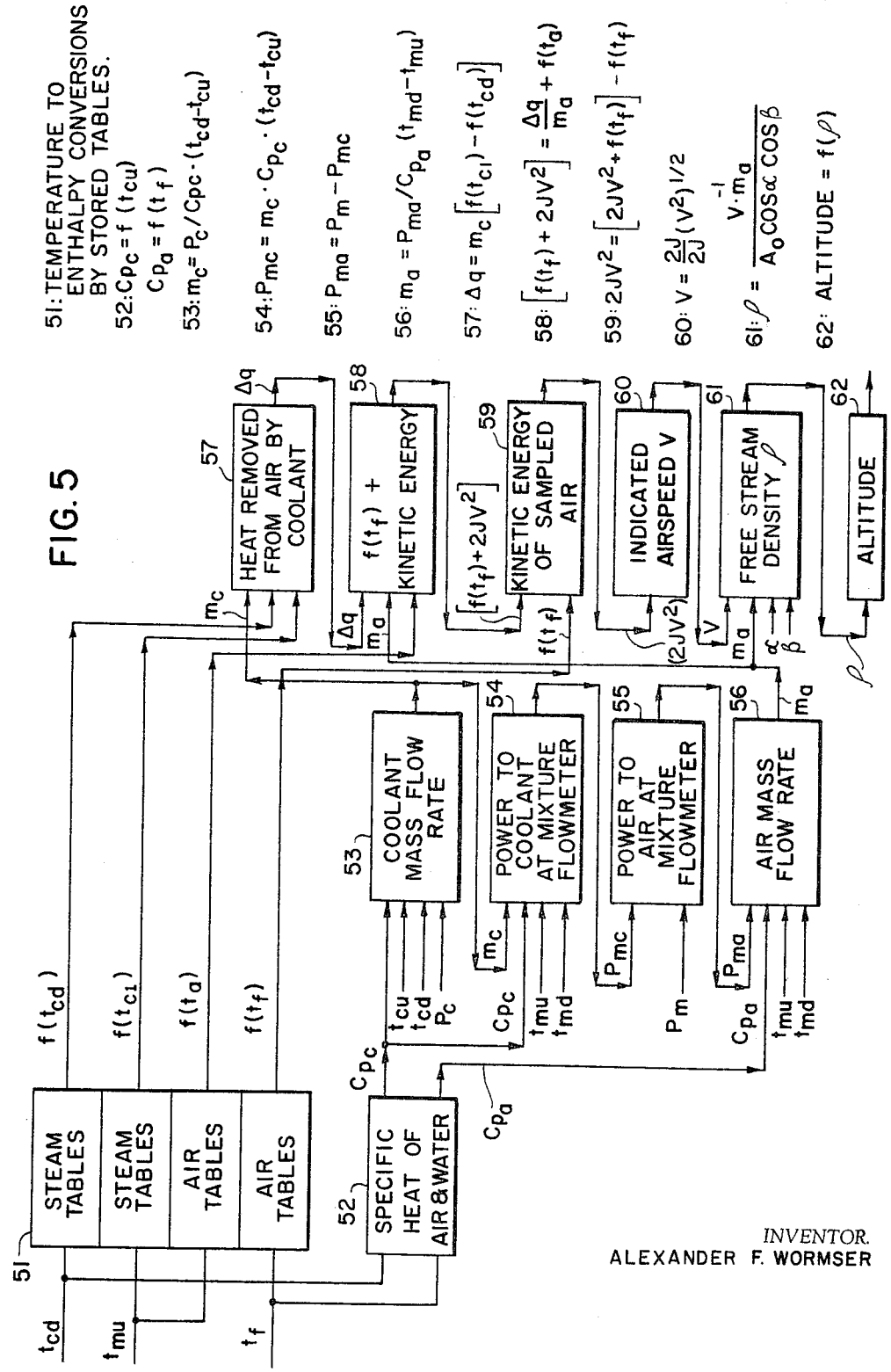

INVENTOR.
ALEXANDER F. WORMSER

United States Patent Office 3,283,572
Patented Nov. 8, 1966

3,283,572
SPACE VEHICLE NAVIGATION SYSTEM
Alexander F. Wormser, Nahant, Mass., assignor to General Electric Company, a corporation of New York
Filed Dec. 31, 1962, Ser. No. 248,365
15 Claims. (Cl. 73—178)

This invention relates to air data ascertaining method and means which are capable of providing continuous output navigational information based upon continuous input sensing of data throughout the operation. More particularly, the invention relates to method and means for ascertaining certain parameters of the air through which a space vehicle reentering the atmosphere passes, for the purpose of determining the air speed and altitude of the space vehicle during that interval of reentry characterized by hypersonic flight, to thereby permit safe navigation of the vehicle.

There is a period during a space vehicle's reentry into the earth's atmosphere in which the air speed and altitude of the vehicle are ascertained not only with difficulty but with substantial possibility of error. Unfortunately, it is during this period that accurate determination of air speed and altitude are important for the safety of the vehicle. There is a virtual "corridor" of safety, whose dimensions are altitude and air speed, through which the space vehicle must pass during reentry. If the vehicle travels outside this "corridor" the result may be an excessive heating of the vehicle, with the danger that the vehicle will literally burn up, or excessive acceleration loads may develop, endangering the operation of the vehicle and the lives of the personnel aboard. These dangerous possibilities are due to the fact that reentry of the vehicle through the range of altitude from 300,000 feet down to 100,000 feet is through air sufficiently dense and at such high speeds that the frictional heat generated by the passage of the vehicle through the air produces extremely high temperatures at the surface of the vehicle. Unless vehicular speed and altitude are carefully mutually balanced, i.e., unless the vehicle is kept in the "corridor," the heat generated may be sufficiently great to cause disintegration of the space vehicle.

It is therefore absolutely essentially that the reentry corridor be negotiated properly from an altitude of 300,000 feet down to 100,000 feet. It is, of course, necessary that the corridor above and below that altitude range also be negotiated successful and correctly. However, in the altitudes outside of this range, the required data for ascertaining altitude and air speed are readily obtainable, and therefore control of the vehicle's path is no serious problem. This is so because outside of this altitude range, radio communication from the earth with the space vehicle is easily established. Airborne radar Doppler and radio beacon techniques may be used to obtain this data; also, radar determination from the earth, of the vehicle's air speed and altitude are readily telemetered to the space vehicle to thereby enable the space vehicle to automatically control or correct its flight path. In the critical altitude range, however, the air surrounding the vehicle is highly ionized (forms a plasma sheath about the vehicle), due to the intense heat generated. Furthermore, the air is sufficiently dense in this altitude range such that the sheath of electrically charged particles is dense enough to seriously interfere with transmission therethrough of radio waves to the space vehicle. Electromagnetic communication through the sheath, therefore, is not feasible in this critical altitude range which is also characterized by hypersonic air speed of the vehicle. The term "hypersonic" is used in this sense to denote air speds of Mach 4 and above, meaning speeds wherein the air speed of the vehicle is at least four times greater than the speed of sound at that air density and temperature.

The apparatus and method presently used in the art for providing the required air speed and altitude information for controlling the space vehicle is based upon an inertial navigation system. Inertial navigation is a form of dead (deduced) reckoning navigation, wherein the extremely stable gyro platform established by the inertial navigation system is used as a frame of reference from which subsequent motions and accelerations of the vehicle are readily determined to permit computation of air speed and position with a high degree of accuracy. In the prior art system, therefore, the vehicle's air speed and altitude are telemetered to the vehicle just prior to its coming down to the 300,000 foot altitude and is utilized to set in the initial conditions for the inertial navigation system. Thereafter, when radio communication is no longer feasible, the inertial navigation system takes over the determination of speed and altitude for the vehicle to thereby generate appropriate signals for controlling the space vehicle and maintaining it within the required reentry corridor.

Although such a system is in many ways satisfactory, it suffers from substantial drawbacks when the reentering vehicle must pass through the critical altitude range over an extended period of time. Thus, for example, hypersonic glide vehicles such as Dyna-soar may well be required to pass through the critical altitude range for periods up to as long as one hour. This results in a serious problem, since an inherent time dependent cumulative error exists in the inertial navigation system due to the system's imperfect knowledge of the true vertical with respect to earth's center. Unavoidable errors in altitude and air speed determination are built up during the descent of the vehicle through the critical altitude range. For a period as long as one hour, such an error in the determination of altitude may be as great as 25,000 feet. Furthermore, should the inertial navigational system generate errors due to mechanical failures, there is no auxiliary or redundant system available to fill the breach which functions independently of inertial navigation.

It is an object of this invention, therefore, to provide a space vehicle air speed and altitude determine system which is independent of external electromagnetic radiation reception and independent of inertial guidance.

It is another object of this invention to provide a space vehicle navigation system capable of providing continuous air speed and altitude information derived from continuously sampled data from the immediate environment of the space vehicle.

The above objects of the invention are achieved by hypersonic air data navigational sensing method and means which return to the laws of conservation of energy and mass for their theoretical bases. More specifically, it has been ascertained, in accordance with the principles of the invention, that it is possible to determine the hypersonic velocity of a space vehicle during reentry through the critical altitude range by:

(1) Sampling the air stream immediately in front of the space vehicle with a sensor;
(2) Injecting a coolant into the air inside the sensor chamber;
(3) Decelerating the air to subsonic speeds to form a shock wave within the chamber, with a resultant dissociation of the components of the air;
(4) Recombining the dissociated particles; and
(5) Performing the following measurements during this process:
    (a) The temperature and mass flow rate of the coolant prior to injection into the sampled air; and (b) The temperature and mass flow rate of the air and coolant mixture after recombination.

With these measurements, and the use of an equation inherent in the law of conservation of energy, the indicated air speed V of the space vehicle is readily computed and is continuously generated since the sampling of the air and the measurements of the parameters are continuous.

The coolant has the function of reducing the temperature of the heated sampled air so as to tend to eliminate dissociation of the cooled gases. Temperature measurement of uncooled dissociated gases in the hypersonic region is useless for the determination of air speed under the law of conservation of energy, since the major portion of the energy is in the form of chemical energy. Thus, dissociation must be eliminated or minimized and final temperature measurement undertaken only after recombination. The air is cooled with an open, rather than a closed heat exchanger. The use of an open heat exchanger is an important feature of the invention. Utilizing an open heat exchanger in the form of a fluid coolant such as helium or water injected in the sampled air results in higher pressure within the chamber containing the sampled air and coolant mixture than would be the case if a closed heat exchanger were used (a closed heat exchanger being a radiator with the coolant not directly in contact with the heated air). Using the open heat exchanger results in having the recombination take place over a much shorter distance (and therefore having a much shorter chamber) by a factor of ten, since the recombination rates of dissociated gases are directly proportional to pressure. Furthermore, the coolant is introduced as close to the entrance of the chamber as is physically possible. Thus, the cooling process starts prior to the shock wave and thus prior to dissociation. This results in precluding much dissociation that would otherwise take place, and further decreases the required length of the sensor chamber since recombination is minimized.

With indicated air speed obtained, it is then also possible to obtain the atmospheric or freestream density which is closely related to altitude. The only additional data required is the attitude of the aircraft, i.e., angles of attack and sideslip, to ascertain the amount or mass of air that is actually being sampled or captured for the measurement. Utilizing the principle of conversation of mass, the freestream density may then readily be computed from indicated air speed angle of attack, and sideslip angle. Freestream density is directly convertible into altitude, using standard atmospheric data.

The continuously generated air speed and altitude determinations, in the form of computer output signals, may thus be utilized as control signals for correcting the course of the reentering vehicle to conform with the constraint of the reentrant cooridor.

To determine altitude in this manner, it is necessary that the sensor sample the air forward or upstream of the leading point of the space vehicle nose cone. This insures that shock waves are not formed prior to sampling the air. This requirement is due to the fact that the physical relationship, involving velocity and angles of attack and sideslip, from which freestream density (and therefore altitude) is determined, fails if the air is subsonic prior to entering the sensor inlet. However, in an alternative embodiment, altitude may be determined with the sensor sampling air at, rather than upstream of, the leading edge of the nose cone. This is because a parameter other than angles of attack and sideslip may be used in conjunction with velocity to provide a relationship which is a function of freestream density.

Embodiments of a hypersonic air data sensor in accordance with the principles of the invention have the advantage of being smaller and lighter than the radio or radar equipment that would otherwise be required and is lighter than inertial gear. Furthermore, the hypersonic sensor automatically compensates for atmospheric variations by its very nature. Since heating of the space vehicle depends upon density, which varies daily and varies with location, density altitude may be more useful information than geometric altitude.

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings.

In the drawings:

FIG. 1 is a perspective view of one embodiment of the invention given by way of example for purposes of illustration wherein the air data sensor is shown with its probe extending forward of the space vehicle;

FIG. 2 is a longitudinal cross-section of the entire air data sensor of FIG. 1;

FIG. 3 is a combined perspective and schematic representation of a flowmeter and control circuit therefor for use in the sensor of FIG. 2;

FIG. 4 is a graphic representation of certain data helpful in understanding the effectiveness of the apparatus represented in FIGS. 1–3;

FIG. 5 is a flow diagram of a computer with computational equations for each block, that may be used for performing useful computations with data signals derived from the apparatus of FIGS. 1–3; and FIG. 6 is a graphic representation of the accuracy of control data obtained by alternative method and means to those of the embodiment of the invention represented by FIGS. 1–5.

FIG. 1 provides a general perspective view of a hypersonic air data navigational sensing device 11 disposed extending from nose cone 13 of the space vehicle. Only a small probe portion of the sensor extends forward or upstream of the foremost portion of nose cone 13. This insures that the air sampled by the probe through its inlet orifice 15 is in fact sampled prior to the generation of shock waves, and is not subsonic.

In FIG. 2 there is presented a detailed perspective cutaway view of the entire sensing device 11. Hypersonic air data sensor 11 consists of five longitudinally extending sections in tandem. Sensor 11 may be viewed as a chamber comprising successive sections of right cylindrical and right conical truncated geometries. Commencing at the left or upstream end is inlet orifice 15 which leads directly into inlet chamber 14 of inlet section 16; the internal configuration of chamber 14 may be that of a hollow right cylinder. In section 16, the external shell is double walled and comprises inner and outer walls 17 and 18 between which is the coolant passage 19. The coolant is injected into inlet chamber 14 which is at the leading edge of the sensor. Inner and outer walls 17 and 18 may be securely spaced from each other by insulating spacers. Coolant passage 19 opens into the inlet chamber 14 as an annular slot 20 whereby a conflux of hypersonic air and coolant fluid is formed.

The coolant, such as water or helium, has its temperature sensed and its mass flow signaled and/or indicated prior to its injection into the inlet chamber 14. Inner and outer walls 17 and 18 are in a region which must withstand extremely high temperatures, and for that reason are cooled by the coolant as well as by radiation, and are constructed of a material having high thermal conductivity and diffusivity as well as high temperature strength and emissivity. Nickel or iron based superalloys are particularly appropriate, although copper or gold based alloys may be used. Immediately surrounding the external portion of outer wall 18 is a sheath of ablative material 24, such as nylon. The ablative material chars during reentry of the vehicle and contributes to maintaining the external region cool. The internal regions of the sensor, however, are free of ablative material to insure that nothing contaminates the sampled air and its flow.

Diffuser section 29 of the sensor is immediately aft or downstream of inlet section 16. The diffuser tapers from the narrow circular cross-section of inlet 16 to a larger diameter circular cross-section at its downstream end. Thus, diffuser 29 is a diverging passage which effectively results in deceleration of the incoming air. The deceleration results in shock waves within diffuser 29 and the air velocity changes from supersonic to subsonic in the shock wave. To insure that the normal shock remains in diffuser section 29 over the critical altitude range and is not disgorged, an appropriate cross-sectional area ratio of the upstream and downstream ends of diffuser 29 is at least one to six. It is to be understood that the shock waves move along the diffuser as the flight conditions change, but this ratio is designed to maintain the shock waves within the region of the diffuser over the critical altitude range. The wall structure of diffuser 29 includes a ceramic insulating wall 31 within the inner superalloy wall 17. Wall 31 contributes to insulating the regions of the sensor wherein it is desired to maintain adiabatic flow, that is, any transfer of heat is due solely to that which takes place between air and coolant within the internal passage of sensor 11. The location of the insulation is not critical nor is the nature of the insulation which may alternatively be, for example, an ablative material or air gaps.

Mixing chamber section 33 follows immediately after diffuser 29. The internal wall 17 in mixing chamber 33 may be in the shape of a right cylindrical section. It is in this chamber that the air and coolant are permitted to mix thoroughly and come to equilibrium, that is, the dissociated gases due to the shock waves generated in diffuser 29, are permitted the opportunity to recombine over the length of mixing chamber 33. The length of the mixing chamber is determined by the recombination rate of the dissociattion products; this rate is a function of temperature and pressure in the mixing chamber.

The fourth section of sensor 11 is the air-coolant mixture flow meter 35, comprising means for sensing the temperature of the recombined air and coolant mixture and for determining the mass flow rate of the mixture. The geometry of mixture flow meter 35 region is a literal extension of mixing chamber 33, being right cylindrical in shape and housing the flow meter. A description of an appropriate flow meter will be presented below. A similar flow meter 49 senses the temperature and signals and/or indicates the flow rate of the coolant just prior to its entrance into coolant passage 19 from coolant inlet 41.

The exhaust nozzle is the final section of sensor 11. The cross-sectional area of exhaust nozzle 37 tapers down from its larger upstream cross-section to the smaller cross-sectional area of the throat 63, and thereafter expands to a wider cross-sectional area at its downstream end. The longitudinal axis of exhaust nozzle 37 and the entire exhaust nozzle itself may be displaced from the longitudinal axis of the rest of sensor 11 (although not so shown in the drawing) to allow exhaust of the air and coolant mixture to exit from the space vehicle. The sizing of throat 63 is such that the flow through the nozzle is sonic at the throat. In manner well known in the art, the sizing of the throat may be designed to insure that the shock will not disgorge (which happens if the sizing is too small) and at the same time to make sure that the shock does not move downstream and reduce the pressure in mixing chamber 33 (which happens if the sizing is too large). The proper sizing may be readily determined, since it is a function of the pressure in the diffuser at the minimum altitude of the critical altitude range, and the speed at that altitude. The equations needed to obtain the pressure ratio across the normal shock at the minimum altitude are presented in such standard works as "The Dynamics and Thermodynamics of Compressible Fluid Flow," vol. 1, by A. H. Shapiro, Ronald Press, New York, 1953.

Typical proportions of the overall sensor of FIG. 2 are as follows: overall length, four feet; outside diameter in the region of mixing chamber 33 and flow meter 35, three inches; internal diameter and length of mixing chamber 33, two and one-half inches and six inches, respectively; length of the probe portion of sensor 11, i.e., that part of the sensor upstream of the leading edge of the nose cone, may be one inch; and the diameter of inlet orifice 15, one-half inch. The total amount of coolant may be approximately five pounds; it is the amount of coolant needed to bring the sampled air temperature down to 1,500°–3,000° F., and preferably near 2,000° F., during sampling over the critical altitude range. The coolant is introduced into coolant passage 19 between walls 17 and 18 by virtue of coolant inlet 41 located in the region of mixing chamber 33. Although not shown in detail, a flow meter such as the one located within flow meter section 35 of the sensor is required to determine the mass flow rate of the coolant flowing into coolant inlet 41. The same type of flow meter that is used in a flow meter section 35 may also be used for this purpose. The temperature signal derived from sensor 43 of the flow meter 35 may be used to control the rate of coolant introduced into the inlet chamber 14 of sensor 11. Thus, if temperature sensor 43 signals a mixture temperature in excess of 2,000° F., this signal may be used to open wider the control valve used to control the rate of coolant flow into coolant passage 19.

In FIG. 3 there is disclosed an appropriate type of flow meter for use in the sensor of FIG. 2, which provides information with respect not only to the mixture mass flow rate, but also the temperature of the mixture entering the flow meter. Flow meter 35 comprises three major elements; they are the upstream temperature sensor 43, the downstream temperature sensor 44, and the heating element 45 which is disposed between sensors 43 and 44 and is located as closely adjacent to the downstream temperature sensor 44 as is physically practical. As the air and coolant mixture passes temperature sensor 43, the temperature of the mixture is sensed. On passing the heating element 45, a fixed amount of power is introduced from heater 45 to the mixture; the temperature of the heated mixture is then signaled by sensor 44. With these signals the mass flow rate of the mixture is readily determined, utilizing the principle of conservation of energy. The mass flow rate is a function of the power supplied by the heater, the specific heat of the mixture, and the temperature rise of the mixture between sensor 43 and sensor 44, due to heater 45. Since the specific heats of air and the coolant are well known, and a control circuit keeps constant the power supplied the mixture by the heater, the temperature signals provided by the upstream and downstream sensors are sufficient to provide all of the data needed to ascertain the mass flow rate, as will be demonstrated hereinafter in greater detail.

Considering the construction of flow meter 35 in greater detail, temperature sensor 43 is a resistance-temperature sensitive wire which is placed across the flow meter chamber in a plane perpendicular to the longitudinal axis of the chamber and is in the form of a grid. The grid construction may be parallel wires which are only a few wire diameters apart. Heater element 45 is similar in construction to temperature sensor 43 and is similarly mounted across the chamber, except that the heater element grid wires are oriented perpendicularly to the wires of temperature sensor 43. This helps avoid the possibility of a temperature sensor element being in the wake of a heater element. Downstream temperature sensor 44 is spaced from and oriented in the chamber in a similar manner as temperature sensor 43, and is in all respects similar to grid 43. Grid 44 is as close as is practical to heater grid 45, in order to minimize time of response of the system. In the event of the mixture flow being cut off, downstream sensor 44 is heated first and permits the turning off of power to heater element 45.

The flow meter is controlled by a simple circuit, well known in the art, to provide the required control. Voltage regulator 47 provides the flow meter with a carefully regulated D.-C. voltage. The regulated voltage is placed across heater grid 45 in the flow meter. The power to heater grid 45 thus remains constant and requires no measurement during the operation of the flow meter. Bridge circuit 48 is provided with two of the resistive elements thereof being the upstream and downstream temperature sensitive resistors 43 and 44, while the other two resistors 51 and 52 of the bridge circuit are constructed of temperature-insensitive alloys, such as gold-chromium. In this arrangement, the bridge circuit is nulled for a particular mass flow rate; therefore, the voltage output from bridge circuit 48 is a direct measure of mass flow imbalance from the null. An operational amplifier 54 is used to amplify the voltage output of the bridge circuit and provide an indication on meter M.

Both temperature sensors 43 and 44 and heater grid 45 are suspended from the inner wall of flow meter section 35 through supports, for the purpose of minimizing heat leakage by conduction. These supports are thin, U-shaped members of insulating material which form a minimal contact with the wires of the sensor and heater elements.

With the temperature signals and mass flow rate measurements provided by flow meter section 35, and the temperature signals provided by thermocouple wires 21–22, not shown, but the location of which is indicated in FIG. 2 at inlet section 16, as well as the coolant mass flow rate provided by the coolant flow meter 49 upstream in the coolant passage, all of the measurements required to ascertain velocity (indicated air speed) of the reentering space vehicle are provided. It can be demonstrated that indicated air speed is equal to the following expression:

$$V = \left[ \frac{f(t_{mu})[m_c + m_a] - f(t_{cd})m_c}{m_a} - f(t_f) \right]^{1/2} \quad (1)$$

where $m_c$ is coolant mass flow rate measured upstream of coolant injection into the airstream; $m_a$ is equal to measured mixture flow rate in flow meter chamber 35, minus the coolant flow rate $m_c$, and therefore equals air mass flow rate; $f(t_{cd})$ is a function of the coolant initial temperature; $f(t_{mu})$ is a function of the mixture temperature determined by temperature sensor 43 in flow meter 35; and $f(t_f)$ is a function of the freestream temperature.

All of the terms on the right-hand side of Equation 1 are terms obtained with the embodiment of the invention described relative to FIGS. 1 through 3, with the exception of $f(t_f)$. Although freestream temperature is an unknown, use of standard atmospheric data produces a negligible error in estimating indicated airspeed. Thus, for example, at 250,000 feet altitude, and a speed of 24,000 feet per second, the freestream temperature represents less than 1% of the kinetic energy. Since kinetic energy is a function of $V^2$ (the square of the left-hand side of Equation 1), the introduction of the error to indicated air speed is indeed negligible, since it will be even less than the 1% contribution to kinetic energy. Thus, the curve of FIG. 4 shows the average error in the velocity determination of Equation 1, with the equipment of FIGS. 1 through 3, due to the use of standard atmospheric data for $f(t_f)$, rather than actually measured freestream temperature. Accordingly, standard atmospheric data for $f(t_f)$ over the critical altitude range is stored in the memory portion of the computer carried in the space vehicle which is used to perform the computation of Equation 1. Greater detail concerning this computation is presented hereinafter. It may be seen from Equation 1 that indicated air speed $V$ determined this way, in accordance with the principles of the invention, is independent of angles of attack and sideslip, as well as Mach and Reynolds numbers, previous flight path, real gas, low density, and non-equilibrium effects. The hypersonic air data sensor, in accordance with the principles of the invention, therefore, is not primarily dependent upon, nor does it require, calibration in a shock tube or wind tunnel.

With indicated air speed $V$ obtained, freestream density $\rho$, and therefore altitude which is closely related to freestream density, is determined with two more items of data. Based upon the law of conservation of mass, it can be demonstrated that:

$$\rho = \frac{V^{-1} \cdot m_a}{A_0 \cos \alpha \cos \beta} \quad (2)$$

where $A_0$ equals the area of orifice 15 of inlet chamber 14 of the hypersonic air data sensor, $\alpha$ is angle of attack and $\beta$ is angle of sideslip. The total angle of attack of a space vehicle is defined as the angle between the reference longitudinal axis of the vehicle and the total airstream velocity vector. The total angle of attack is normally resolved into two angles, measured in two orthogonal reference planes whose intersection forms the vehicle longitudinal axis. These angles are body-fixed and are referred to as angle of attack $\alpha$, which is measured about the pitch axis, and angle of sideslip $\beta$, which is measured about the yaw axis. This equation is derived from the well known continuity equation based upon the principle of conservation of mass (see "Handbook of Astronautical Engineering," McGraw-Hill, 1961).

Measurement of angles of attack and sideslip may be readily obtained by various measuring means well known to those skilled in the art. For example, symmetry of surface temperature of the space vehicle may be the mechanism for obtaining the variables. Thus, the surface temperature around an insulated symmetrical object like a hemisphere placed at the leading edge of the vehicle such as the nose cone or the wing, is symmetrical with respect to the stagnation point, with a temperature maximum occurring at the stagnation point. The stagnation point is the point on the vehicle surface where the velocity is zero and flow diverges around the vehicle. Then the angles of attack and sideslip may be found by a measurement of the angles between the maximum temperature point and the vehicle pitch and yaw axes. This may be done with an array of fixed temperature sensors located in the surface of the symmetrical object. Alternatively, symmetry of pressure may be the principle for ascertaining angle of attack and sideslip angle. Thus, the surface pressure distribution around a symmetrical object such as a hemisphere placed at the leading region of the vehicle such as the nose cone or the wing, is also symmetrical with respect to the stagnation point, with the pressure maximum occurring at the stagnation point. Thus, the angles of attack and sideslip may be found by measurement of the angle between the maximum pressure point and the vehicle pitch and yaw axes. This may be ascertained with an array of fixed pressure taps on the surface of the vehicle, or with a servoed "Q-ball," such as is used on the present X-15 aircraft, and which projects forward and upstream of the nose of the craft.

With freestream density $\rho$ ascertained, it is relatively easy to ascertain altitude based upon empirically determined data. Air density at any given altitude in the critical range is not a constant and varies up to about ±15%. However, such a density variation represents a relatively small altitude variation. In the table immediately below are given some representative values for the percentage change in air density per 10,000 feet of altitude, at different altitudes over the critical altitude range.

| Altitude (Thousands of Ft.) | 100–110 | 150–160 | 200–210 | 230–260 |
|---|---|---|---|---|
| Percent Density Change per 10,000 Ft. | 68 | 50 | 29 | 50 |

Thus, even in the most sensitive region, i.e., at 200,000 feet, the maximum density variation of ±15% would result in an error in altitude of not more than approximately 5,000 feet since air density changes 29% per 10,000 feet at that altitude. Furthermore, since vehicle lift, drag, and heating are all functions of true density and not altitude, measurement of density is actually preferable to measurement of altitude when these quantities are computed.

FIG. 5 is a flow diagram representation of an analog computer for implementing the computations of Equations 1 and 2. There are other ways of implementing the computations of these equations, and the particular algorithm represented by the flow diagram of FIG. 5 may be varied as the specific requirements of computer and space vehicle hardware indicate. Indeed, where otherwise appropriate, digital circuits may be used to mechanize the flow diagram algorithm of FIG. 5. Analog computation circuits appropriate for mechanization of the flow diagram are well known in the art and are available in standard texts on the subject, such as "Electronic Analog Computers," by G. A. and T. M. Korn, McGraw-Hill Book Co., second edition, 1956.

The legend in each of the blocks 51 through 62 inclusive of FIG. 5 is a functional statement of the output quantity of that block derived from the computation performed in that block. The lead lines connecting outputs of certain blocks to inputs of others show how earlier computed quantities are used in performance of later computations. Where an input lead is not derived from an output lead of another block, then the labeled quantity of that lead is derived from actually measured data or from empirically determined standard air data. Included in FIG. 5, next to each number 51–62, is the equation or equations actually solved by that numbered block of the flow diagram. The equations and flow diagram of FIG. 5 are a self-contained description of this preferred algorithm for implementing the solution of Equations 1 and 2. An Appendix at the end of this specification defines the notation used in FIG. 5.

The embodiment of the invention represented in its various aspects in FIGS. 1 through 5, requires that the probe portion of sensor 11 extend forward or upstream of the leading edge of the nose cone of the space vehicle. This is because the continuity equation, which is a form of the law of conservation of mass, holds only when the dissociation of the air occurs subsequent to the entrance of the sampled air into the chamber. When the normal shock is generated prior to entry of the sampled air into sensor 11, it no longer holds. However, it has been recognized, in accordance with the principles of the invention, that whether normal shock is formed before or subsequent to entrance of the sampled air into sensor 11, the law of conservation of energy obtains. Accordingly, the hypersonic data sensor 11 may be disposed completely within the nose cone so that inlet orifice 15 of sensor 11 is flush with the leading edge of the nose cone. In such an alternative embodiment, Equation 1, previously discussed, is still applicable and indicated air speed V may be obtained in precisely the same manner as was discussed above. Thus, the computation represented in FIG. 5 up to and including block 60 for indicated air speed V is applicable. However, the computation of free-stream density $\rho$ and thence altitude, must be obtained in another way than that of sensing the angles of attack and side-slip, since the continuity Equation 2 above, is no longer applicable. Nevertheless, having indicated air speed V, it is possible to ascertain the freestream density from the following empirically determined expression for dynamic or stagnation pressure:

$$P_t \approx 0.95_\rho V^2 \quad (3)$$

where $P_t$ equals stagnation pressure in pounds per square foot, $\rho$ equals freestream density in slugs per cubic foot, and V equals vehicle velocity in feet per second. The estimated theoretical accuracy of Equation 3 is shown by the curve of FIG. 6 (which is determined using equilibrium air data) over the major portion of the critical altitude. From Equation 3, it may be seen that freestream density $\rho$ may be obtained if stagnation pressure is ascertained, since the V has already been determined from Equation 1. Stagnation pressure $P_t$ is defined as pressure at the stagnation point or point of zero fluid velocity in the boundary layer at the vehicle's surface. $P_t$ may be determined as is well known in the art, with pressure sensing equipment similar to that previously described for ascertaining angle of attack. Thus, with an array of pressure taps on the surface of the nose cone, or a "Q-ball" device, stagnation pressure may be measured. Freestream density $\rho$ is then readily computed from Equation 3.

The embodiment in accordance with the invention may utilize various alternative components and arrangements consistent with the principles of the invention. Thus, for example, a sonic nozzle flowmeter, well known in the art, may be used in lieu of the flowmeter disclosed in FIG. 3. However, if a sonic nozzle flowmeter is used, Reynolds number effects may possibly provide a source of error, although it is believed that the magnitude of the error would be relatively small. The geometry of the coolant annular slot 20 in section 16, and coolant passage 19 between walls 17 and 18 may be varied if indicated by the constructional geometry required for the rest of the space vehicle. Thus, for example, a multiplicity of coolant tubular passages may be utilized, instead of passage 19, which may open into inlet chamber 14 through a multiplicity of ports rather than through one annular circumferential slot 20. Coolants other than water and helium may be used; for example, other types of inert element fluids may be utilized.

While the principles of the invention have now been made clear in illustrative embodiments, there will be immediately obvious to those skilled in the art many modifications in structure, arrangement, proportions, the elements, materials, and components, used in the practice of the invention, and otherwise, which are particularly adapted for specific environments and operating requirements, without departing from those principles. The appended claims are therefore intended to cover and embrace any such modifications, within the limits only of the true spirit and scope of the invention.

*Appendix*

$A_0$: area of inlet orifice 15 which is a constant.
$C_{pa}$: specific heat of air.
$C_{pc}$: specific heat of coolant.
$f(t_a)$: air enthalpy at sensor 43.
$f(t_{cd})$: coolant enthalpy which is an empirically determined function of coolant initial temperature.
$f(t_{cl})$: coolant enthalpy at sensor 43.
$f(t_f)$: freestream enthalpy which is an empirically determined function of freestream temperature.
J: Joule's constant.
$m_a$: air mass flow rate.
$m_c$: coolant mass flow rate as determined by coolant flowmeter.
$P_c$: power to coolant by heating element of coolant flowmeter.
$P_m$: power to mixture by heating element 45 of mixture flowmeter 35.
$P_{ma}$: power to the air of the mixture at mixture flowmeter.
$P_{mc}$: power to the coolant of the mixture at mixture flowmeter.

$P_t$: stagnation pressure.
$t_{cd}$: temperature of the coolant signaled by the downstream sensor of the coolant flowmeter.
$t_{cu}$: temperature of the coolant as signaled by the upstream sensor of the coolant flowmeter.
$t_f$: freestream temperature from standard air data.
$t_{md}$: temperature of the mixture as signaled by the downstream sensor 44 of mixture flowmeter 35.
$t_{mu}$: temperature of the mixture as signaled by the upstream sensor 43 of mixture flowmeter 35.
V: space vehicle velocity or indicated air speed.
$\alpha$: angle of attack.
$\beta$: sideslip.
$\Delta q$: amount of heat removed from the air by the coolant.
$\rho$: freestream density.

The air and steam tables stored in the computer block 51 for temperature to enthalpy conversion at low pressure may be obtained in standard works such as "Gas Tables," by J. H. Keenan and J. Kay, (John Wiley and Sons, 1945) for the steam tables, and "Thermodynamic Properties of Steam" by the same authors and publisher (1936) for the steam tables.

What is claimed as new and desired to be secured by Letters Patent of the United States is:

1. The method of determining a vehicle's speed comprising the steps of: taking a sample of the air stream surrounding the vehicle; cooling the sample of said air stream with a fluid coolant; ascertaining the fluid coolant's temperature and mass flow rate prior to cooling said air; decreasing the velocity of said air; and sensing said air's temperature and mass flow rate after it has been cooled and decelerated.

2. The method of determining the atmospheric density surrounding a vehicle comprising the steps for determining said vehicle's speed recited in claim 1 and the step of determining said vehicle's attitude.

3. The method of determining the atmospheric density surrounding a vehicle comprising the steps for determining said vehicle's speed recited in claim 1 and the step of determining the stagnation pressure at said vehicle's surface.

4. The method of determining a vehicle's speed comprising the steps of: taking a sample of the air stream surrounding the vehicle; mixing a fluid coolant with the sample of said air; sensing the fluid coolant's temperature and mass flow rate prior to mixing said coolant with said air; decreasing the velocity of said air and coolant mixture; and sensing said mixture's temperature and mass flow rate after said air in said mixture has been decelerated.

5. The method of determining the atmospheric density surrounding a vehicle comprising the steps for determining said vehicle's speed recited in claim 4 and the step of determining said vehicle's attitude.

6. The method of determining the atmospheric density surrounding a vehicle comprising the steps for determining said vehicle's speed recited in claim 4 and the step of determining the stagnation pressure at said vehicle's surface.

7. The method of determining a space vehicle's speed while said space vehicle's velocity is greater than the speed of sound and traveling through an altitude range whereat electromagnetic radiation communication to said space vehicle is not possible, comprising the steps of: continuously sampling the air stream in front of said space vehicle; cooling said air; decreasing the velocity of said air relative to said space vehicle; and ascertaining said decelerated air's temperature and mass flow rate subsequent to said cooling and deceleration, and wherein said deceleration is to subsonic speed, causing a sonic shock wave and dissociation of said air; cooling said dissociated air over a distance of its subsonic travel which is sufficiently great to recombine the dissociated products of said air substantially completely; and sensing said air's temperature and mass flow rate subsequent to said recombination.

8. The method of determining a space vehicle's speed as recited in claim 7 and including the step of increasing the pressure to which said air is subjected in its dissociated state.

9. The method of determining a space vehicle's speed as recited in claim 8 and including the step of increasing said pressure by combining a fluid coolant with said sampled air prior to said deceleration of said air.

10. Space vehicle navigation system comprising air data sensing apparatus comprising: inlet means for continuously sampling the air stream in the environment of said apparatus and cooling means in said inlet means for cooling said sampled air; a diffuser means in tandem with said inlet means and adapted to receive said sampled air from said inlet means for decreasing the velocity of said sampled air; a chamber disposed subsequent to and tandemly in communication with said diffuser means for permitting said air to travel from said diffuser through said chamber with substantially no change in velocity; and sensing means subsequent to and in tandem with said chamber for measuring two parameters which are functions of the temperature of said air and the mass flow rate of said air, means for ascertaining attitude data of said space vehicle, and means for combining said attitude data and said two parameters to determine the altitude of said vehicle.

11. Space vehicle navigation system comprising air data sensing apparatus comprising: inlet means for continuously sampling air in the environment of said apparatus and cooling means in said inlet means for cooling said sampled air; a diffuser means in tandem with said inlet means and adapted to receive said sampled air from said inlet means for decreasing the velocity of said sampled air; a chamber disposed subsequent to and tandemly in communication with said diffuser means for permitting said air to travel from said diffuser through said chamber with substantially no change in velocity; and sensing means subsequent to and in tandem with said chamber for measuring two parameters which are functions of the temperature of said air and the mass flow rate of said air, means for ascertaining stagnation pressure data at said space vehicle's surface, and means for combining said stagnation pressure data and said two parameters to determine the altitude of said vehicle.

12. Air data sensing apparatus comprising: inlet means for continuously sampling air in the environment of said apparatus and cooling means in said inlet means for cooling said sampled air; a diffuser means in tandem with said inlet means and adapted to receive said sampled air from said inlet means for decreasing the velocity of said sampled air; a chamber disposed subsequent to and tandemly in communication with said diffuser means for permitting said air to travel from said diffuser through said chamber with substantially no change in velocity; and sensing means subsequent to and in tandem with said chamber for measuring two parameters which are functions of the temperature of said air and the mass flow rate of said air, wherein said inlet means is a chamber open at both ends and said cooling means is a fluid coolant injected into said inlet chamber to form a mixture with said sampled air.

13. Air data sensing apparatus as recited in claim 12 including means for sensing the temperature and mass flow rate of said coolant prior to said coolant's injection into said inlet chamber.

14. Air data sensing apparatus comprising: inlet means for continuously sampling the air stream in the environment of said apparatus and cooling means in said inlet means for cooling said sampled air; a diffuser means in tandem with said inlet means and adapted to receive said sampled air from said inlet means for decreasing the velocity of said sampled air; a chamber disposed subsequent to and tandemly in communication with said diffuser means for permitting said air to travel from said diffuser through said chamber with substantially no change in velocity; and sensing means subsequent to and in tandem with said chamber for measuring two parameters which are functions of the temperature of said air and the mass flow rate of said air, wherein said sampled air enters said inlet means at a speed greater than that of sound, and wherein said diffuser means is a chamber gradually increasing in cross-sectional area from its upstream end to its downstream end relative to said sampled air, said increase in said diffuser's cross-sectional area being sufficient to decrease the velocity of said sampled air to less than that of sound prior to said sampled air's reaching said diffuser's downstream end, whereby a shock wave is generated in said diffuser means and said sampled air dissociates.

15. Air data sensing apparatus as recited in claim 14 wherein said chamber subsequent to and in tandem with said diffuser is a mixing chamber of cylindrical shape for said air and fluid coolant, and having a length sufficiently long to permit substantially complete recombination of said air prior to said mixture's exiting said mixing chamber.

References Cited by the Examiner

UNITED STATES PATENTS

| | | | |
|---|---|---|---|
| 1,254,374 | 1/1918 | Thomas | 73—204 |
| 1,691,600 | 11/1928 | Brush et al. | 73—204 |
| 2,214,181 | 9/1940 | Rylsky | 73—204 X |
| 2,548,939 | 4/1951 | Brion | 73—202 X |
| 2,549,621 | 4/1951 | Moore | 73—196 X |
| 2,648,224 | 8/1953 | Phillips et al. | 73—204 |
| 2,951,659 | 9/1960 | Yoler | 73—204 X |

FOREIGN PATENTS

| | | |
|---|---|---|
| 743,788 | 1/1944 | Germany. |
| 116,385 | 6/1918 | Great Britain. |
| 761,096 | 11/1956 | Great Britain. |

OTHER REFERENCES

Goldstein, D. L. and Scherrer, R.: "Design and Calibration of a Total-Temperature Probe for Use at Supersonic Speeds." NACA Technical Note, No. 1885, May 1949, 17 pages, pages 5 and 11 of interest.

ROBERT B. HULL, *Primary Examiner.*